No. 653,052. Patented July 3, 1900.
F. A. YOUNGBERG.
WEED TURNING ATTACHMENT FOR CULTIVATORS.
(Application filed May 15, 1900.)
(No Model.)
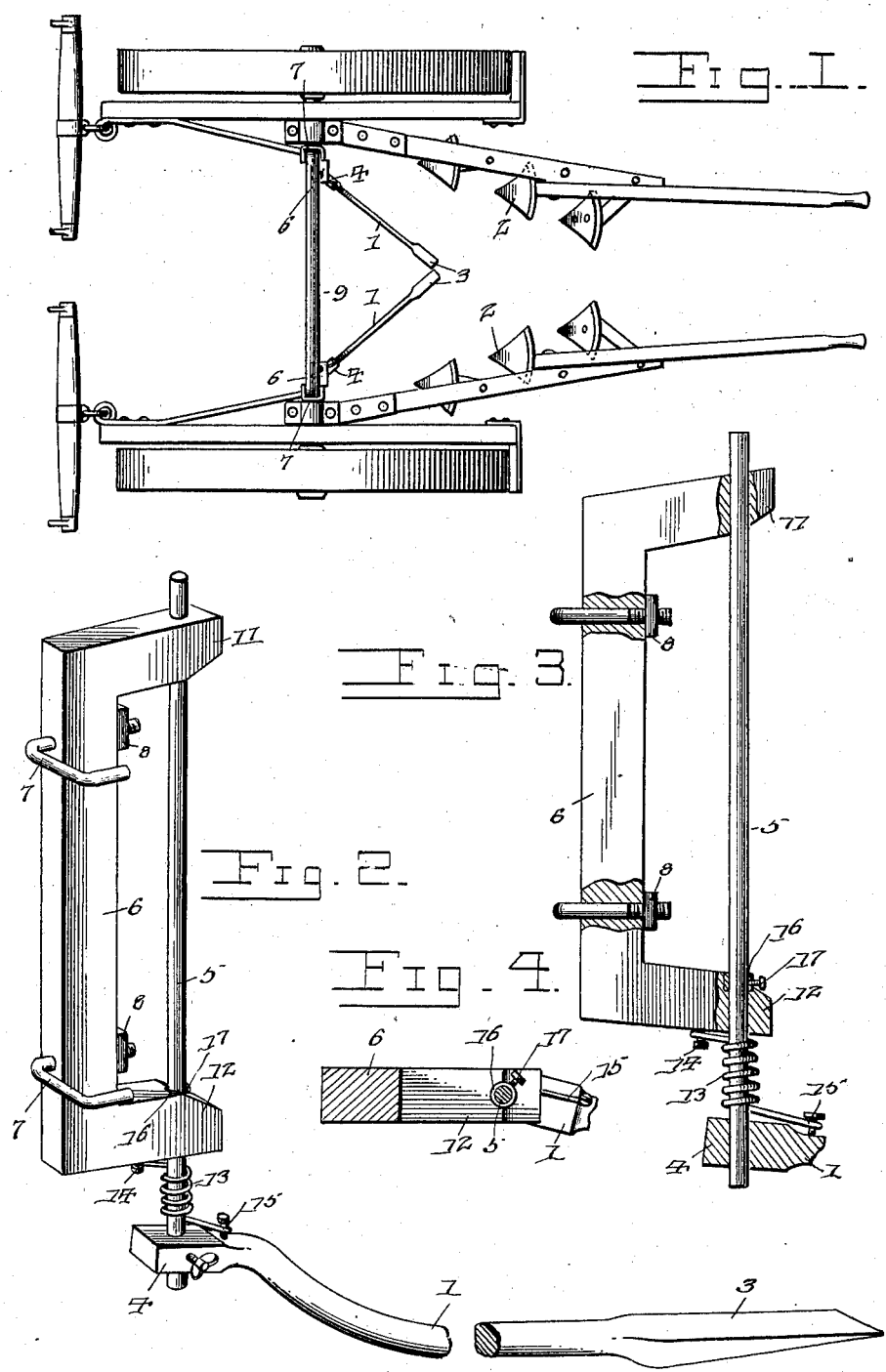
Witnesses
F. E. Alden.
H. J. Riley
Frank A. Youngberg, Inventor
by C. A. Snow & Co.
Attorneys

UNITED STATES PATENT OFFICE.

FRANK A. YOUNGBERG, OF GARFIELD, WASHINGTON.

WEED-TURNING ATTACHMENT FOR CULTIVATORS.

SPECIFICATION forming part of Letters Patent No. 653,052, dated July 3, 1900.

Application filed May 15, 1900. Serial No. 16,822. (No model.)

*To all whom it may concern:*

Be it known that I, FRANK A. YOUNGBERG, a citizen of the United States, residing at Garfield, in the county of Whitman and State of Washington, have invented a new and useful Weed-Turning Attachment for Cultivators, of which the following is a specification.

The invention relates to improvements in weed-turning attachments for cultivators.

One object of the present invention is to improve the construction of weed-turning attachments for cultivators and to provide a simple and comparatively-inexpensive device adapted to be readily applied to and removed from the arch or crank-axle of a cultivator and capable of effectively turning down the weeds, so that they may be covered by the shovels.

A further object of the invention is to provide a device of this character which will readily yield and swing backward to pass a hill or other obstruction in its path, but which will be effectually prevented from swinging laterally or forwardly too far and to the injury of the corn under cultivation.

The invention consists in the construction and novel combination and arrangement of parts hereinafter fully described, illustrated in the accompanying drawings, and pointed out in the claims hereto appended.

In the drawings, Figure 1 is a plan view of a cultivator provided with a weed-turning attachment constructed in accordance with this invention. Fig. 2 is a detail perspective view of one of the weed-turning devices. Fig. 3 is an elevation of the same, partly in section. Fig. 4 is a detail horizontal sectional view illustrating the arrangement of the set-screw and collar for limiting the swing or oscillation of the weed-turning rods.

Like numerals of reference designate corresponding parts in all the figures of the drawings.

1 1 designate a pair of rearwardly-diverging weed-turning rods or arms adapted to drag along the ground in advance of the shovels 2 of a cultivator and having their rear or engaging ends 3 flattened and adapted to overlap and engage and turn down the weeds in advance of the shovels, so that the said weeds may be covered with earth by the cultivator. The front ends 4 of the rods or arms are slightly enlarged and provided with openings for the reception of the lower ends of a pair of vertical shafts 5, which are journaled in brackets or bearings 6. The brackets or bearings 6 are detachably mounted on the upright portions of the arched or cranked axle of the cultivator, as clearly indicated in Fig. 1 of the accompanying drawings, by means of hook-bolts 7 or other suitable fastening devices, which permit the attachment to be applied to the cultivator at the time when the weeds have attained a sufficient height to be covered, which is preferably at the last plowing of the corn under cultivation. The hook-shaped bolts 7, which are provided with nuts 8, engage the arched or cranked axle 9, and the brackets are provided at their upper and lower ends with arms 11 and 12, having vertically-alined perforations to form bearings for the vertical shafts.

The vertical shafts depend from the lower ends of the vertical brackets 6 and receive coiled springs 13, which are interposed between the lower ends of the brackets and the front ends of the rods or arms 1 and which have their terminals 14 and 15 connected, respectively, with the brackets and the arms or rods. The springs hold the arms or rods 1 in the position illustrated in Fig. 1 of the accompanying drawings, and they permit the said arms or rods to swing backward to pass a hill or obstruction in the path of the same. In order to prevent the arm from being thrown backward too far by contact with an obstruction or forward too far by the coil, the shafts are provided with collars 16, having set-screws 17, which engage the shafts and which project outward beyond the collars a sufficient distance to engage the lower portions of the brackets, and they form stops to limit the horizontal oscillation of the weed-turning rods or arms. They also form stops to limit the overlapping of the rear ends of the arms or rods and coöperate with the springs to maintain the same in the position shown in Fig. 1.

It will be seen that the weed-turning attachment is exceedingly simple and inexpensive in construction, that it is adapted to be readily applied to a corn-cultivator, and that the horizontally-movable weed-turning arms are adapted to drag along the ground and turn down the weeds in advance of the shovels, so that the latter may cover the weeds with earth. Furthermore, it will be apparent that the adjustable stops of the shafts are adapted to adjust the weed-turning arms to regulate the overlap of the flattened rear ends of the arms or rods and that they prevent the same from being swung rearward and laterally too far and to the injury of the corn under cultivation when they come in contact with a hill or obstruction in their path.

What is claimed is—

1. A weed-turning attachment for cultivators comprising a pair of brackets provided with means for securing them to a cultivator, a pair of vertical shafts journaled in suitable bearings of the brackets, the horizontally-movable weed-turning arms or rods converging rearwardly and having their rear ends contiguous to each other, springs adapted to hold the arms or rods normally in such position and to permit them to swing backward to pass an obstruction, and means for limiting the backward swing of the rods or arms, substantially as and for the purpose described.

2. A weed-turning attachment for cultivators comprising a pair of brackets provided with means for securing them to a cultivator, vertical shafts journaled in suitable bearings of the brackets, horizontally-movable weed-turning rods or arms mounted on the shafts and converging rearwardly and having their rear ends contiguous to each other, springs for holding the arms or rods normally in such position, and collars mounted on the shafts and provided with set-screws adjustably engaging the same and projecting from the collars and arranged to engage the brackets to limit the forward and rearward swing of the arms or rods, substantially as described.

3. A weed-turning attachment for cultivators comprising a pair of brackets provided at their upper and lower ends with projecting arms having bearings, upright shafts journaled in the bearings and depending from the brackets, fastening devices carried by the brackets for securing them to a cultivator, rods extending from the lower end of the shafts and having their rear ends flattened and arranged contiguous to each other, and springs connected with the rods, substantially as described.

In testimony that I claim the foregoing as my own I have hereto affixed my signature in the presence of two witnesses.

FRANK A. YOUNGBERG.

Witnesses:
J. C. LAWRENCE,
E. W. PORTER.